United States Patent [19]

Tisseau

[11] 4,022,685
[45] May 10, 1977

[54] METHOD OF SEPARATING PRODUCTS OF DIFFERENT DENSITY AND APPARATUS FOR CARRYING OUT THE METHOD

[76] Inventor: Michel Tisseau, La Faucherie, l'Houmeau, 17140 Lagord, France

[22] Filed: May 23, 1975

[21] Appl. No.: 589,781

[30] Foreign Application Priority Data

June 28, 1974 France .............................. 74.22721

[52] U.S. Cl. ............................... 209/157; 209/158; 209/454; 209/464; 241/24

[51] Int. Cl.² ......................................... B03B 5/66

[58] Field of Search ...... 209/12, 18, 155, 157–161, 209/172, 172.5, 173, 461, 463, 464, 454, 492, 450, 261, 262; 241/20, 24

[56] References Cited

UNITED STATES PATENTS

| | | | |
|---|---|---|---|
| 890,906 | 6/1908 | Holmes | 209/158 |
| 891,424 | 6/1908 | Jessup | 209/390 X |
| 1,334,765 | 3/1920 | Lioud | 209/157 |
| 1,715,693 | 6/1929 | Bird | 209/454 |
| 2,225,459 | 12/1940 | Palmrose | 209/173 |
| 2,353,152 | 7/1944 | Erck | 209/173 |
| 2,420,180 | 5/1947 | Laughlin | 209/158 X |
| 2,491,912 | 12/1949 | Walker | 209/173 X |
| 3,043,430 | 7/1962 | Gish | 209/464 |
| 3,074,653 | 1/1963 | Schorsch | 241/14 |
| 3,773,176 | 11/1973 | Loughner | 209/155 X |

FOREIGN PATENTS OR APPLICATIONS

| | | | |
|---|---|---|---|
| 287,449 | 8/1928 | United Kingdom | 209/454 |
| 707,763 | 4/1954 | United Kingdom | 209/155 |

Primary Examiner—Frank W. Lutter
Assistant Examiner—Ralph J. Hill
Attorney, Agent, or Firm—Young & Thompson

[57] ABSTRACT

A method and apparatus for separating an agglomeration of materials having different densities. The agglomeration of materials is fed to a vessel where separation into constituent parts takes place. The vessel is filled with a liquid having a density lower than the constituent materials, the liquid then being injected under pressure into the bottom of the vessel so that lighter materials are entrained in the subsequent liquid flow to be removed from the vessel while heavier materials collect at the bottom of the vessel. Means are provided at the bottom of the vessel to remove the collected heavier material.

9 Claims, 8 Drawing Figures

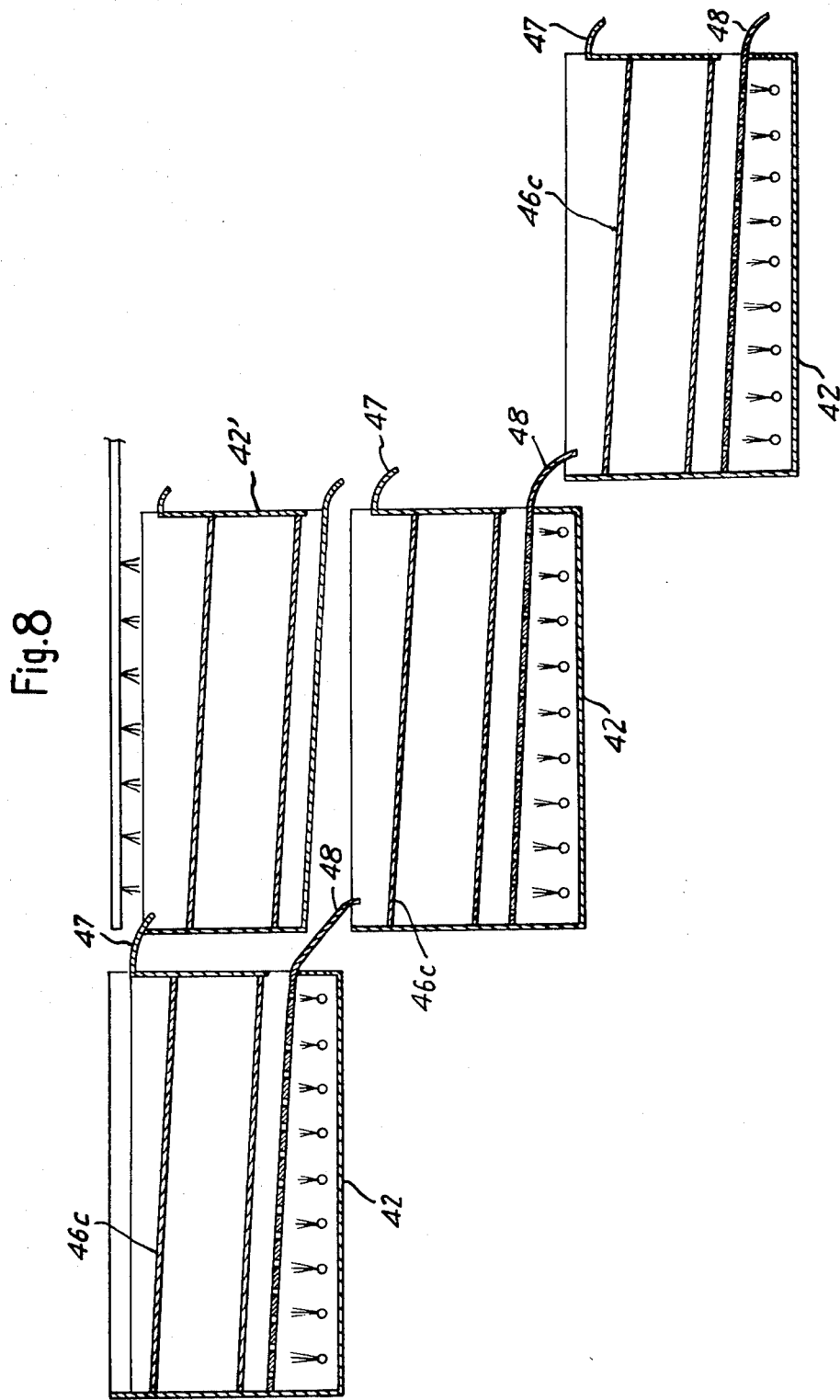

METHOD OF SEPARATING PRODUCTS OF DIFFERENT DENSITY AND APPARATUS FOR CARRYING OUT THE METHOD

The present invention relates to the separation of an agglomeration of materials having differing densities.

As known, it is possible to separate two products having different densities by adding them to a vessel containing a liquid of a density intermediate between those of the two products. The lighter product which floats on the liquid and the heavier product which settles onto the bottom of the vessel can then be separately removed.

However, it sometimes happens that large amounts of a liquid are available, the density of the liquid being slightly lower than that of one of the products and clearly lower than that of the other product. It is then necessary to add a salt to the liquid to increase its density to such an extent that it becomes of a density between the density of the two products. Such an addition, however, considerably increases the cost of the separation operation. Thus for example, if one wishes to separate two products having respective densities of 1.1 and 1.4 pure water cannot be used since the two products would settle on the bottom of the vessel. One must then add salts to the water in order to give the latter a density of the order of 1.2 to 1.3.

An object of the present invention is to provide a method of separating products of different densities by means of a liquid the density of which is lower than those of the two products.

Such a method, in which the products are preferably previously milled and added to a vessel containing a liquid, is characterised in that liquid under pressure is injected into the bottom of the vessel in such a manner as to create an ascending current of liquid in the vessel, the speed of the ascending current being such that the lighter product but not the heavier one is entrained by the current, and the lighter product is recovered from the upper part of the vessel, whereas the heavy product is recovered from the lower part thereof.

The present invention is particularly applicable to the recovery of plastics materials such as those which have been used to form packages, particularly those of polyvinylchloride or PVC of bottles, which permits two problems to be solved: pollution due to plastics material waste and shortage of raw materials for producing plastics materials. As a matter of fact, a bottle made of PVC is covered by a paper envelope and comprises a plug or cap generally of polyethylene. If PVC bottles are crushed or milled, it is not possible to recover the PVC by simply supplying the milled material to a vessel containing water because paper has a density of 1.1, PVC a density of 1.4 and polyethylene a density ranging from 0.925 to 0.930. The paper would then settle on the bottom of the vessel together with PVC. Conversely, if water is injected at the bottom of the vessel, the ascending water current entrains paper and polyethylene, while, if this current is too strong, PVC is not entrained and can be recovered from the bottom of the vessel.

The heavy product can be recovered by transfer from the lower part of the vessel. The same can also be recovered from the upper part of an additional vessel to the bottom of which the heavy product and liquid are supplied at such a rate that the ascending current raises the heavy product within the additional vessel.

It should be recognized, however, that the method according to the invention may be applied for recovering plastics materials other than polyvinylchloride. On the other hand, several products can be separated from each other by using a single separation liquid having a density lower than that of the products by causing the mixture successively to pass through two or several vessels into the bottom area of which a liquid is injected, the liquid rates being of increasing or decreasing value so as to successively separate the products having increasingly higher densities, the heaviest product being recovered at the lower part of the vessel, or, conversely, the products having increasingly lower densities, the lighest product being recovered of the surface of the liquid.

The present invention also relates to an apparatus for carrying out the method.

Such an apparatus comprises at least one vessel having at one of its ends means for feeding the products to be separated and is characterised in that the vessel has a porous bottom wall or is perforated throughout its length, means at its lower part, for longitudinally displacing the products to be separated, and means, at its end opposite to that of admission of the products, for recovering the heavy products present at the lower part of the vessel and the lighter products present at the upper part thereof, and in that it comprises means arranged below the bottom of the vessel to supply a liquid under pressure through the bottom of the vessel.

In an advantageous embodiment of the invention, the vessel has a horizontal section decreasing from the bottom of the vessel towards its upper part. Owing to this arrangement, the speed of the ascending current increases from the bottom of said vessel up to the free surface of the liquid. Thus, it is possible to adjust the speed of the ascending current in such a manner that, at the bottom of the vessel, the same is insufficient to entrain the heavy product, and at the upper part of the vessel it is sufficient to allow the light product to be effectively entrained.

The means for displacing the products to be separated may comprise an endless conveyor. They could also comprise an Archimedian screw or an assembly of two Archimedian screws the axes of which are parallel to one another and arranged in the same horizontal plane. This Archimedian screw or screws advantageously comprise bristles to form brushes. The screw or screws thus play a double role, i.e. they transfer the products to be separated from one end of the vessel to the other and mechanically separate the lighter product possibly adhered to the heavier product. When two screw-brushes are provided, the distance between the axes of the two screws is advantageously less than the outer diameter of each brush, and thus the brushes penetrate one another.

The means for displacing the products to be separated may also comprise a porous or perforated bottom for the vessel. This bottom may have a longitudinal slope; it can also be horizontal and may comprise orientation elements or have openings or perforations some of which extend vertically and others of which extend obliquely, or be formed with perforations some of which have sharp edges along their two longitudinal border whereas other perforations have a sharp edge along one of their borders, whereas their opposite border is rounded. In the case where the products to be separated include a product such as polyethylene, for example, whose density is lower than that of the liquid, the apparatus may comprise an additional vessel similar to the main vessel and arranged below a wetting ramp so as to create, in the additional vessel, a descending current, thereby entraining downwards the heavy product but not the light product.

The apparatus may comprise a plurality of vessels arranged in series and each receiving heavy products recovered from the preceding vessel, the liquid current in each vessel having a progressively increasing speed from one vessel to the other in the downstream direction.

The invention will now be described by way of example with reference to the accompanying drawings, in which:

FIG. 8 is a view of a series of vessels according to the invention.

Figure 1:
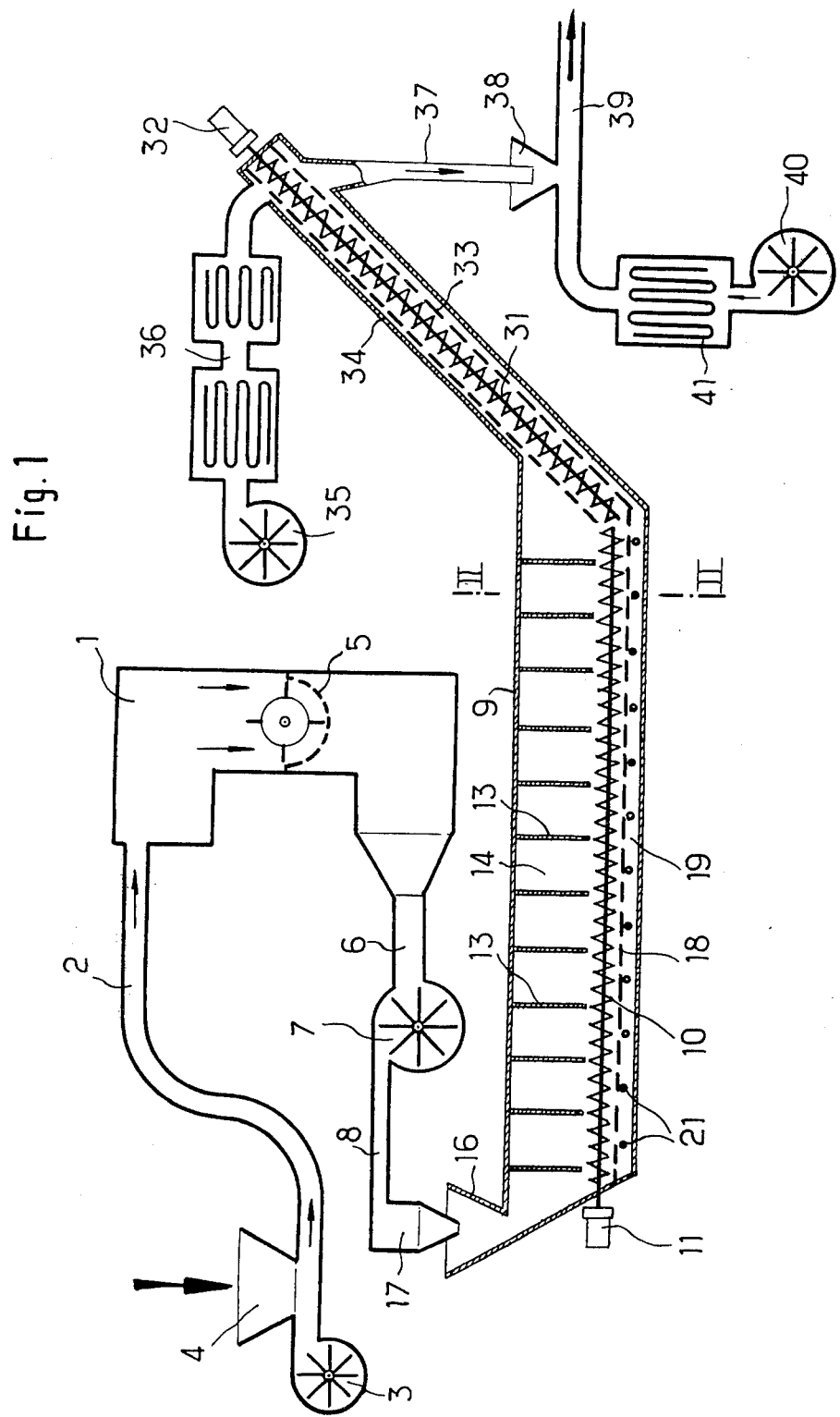
FIG. 1 is an elevational view of a first embodiment of the invention.
Figure 2:
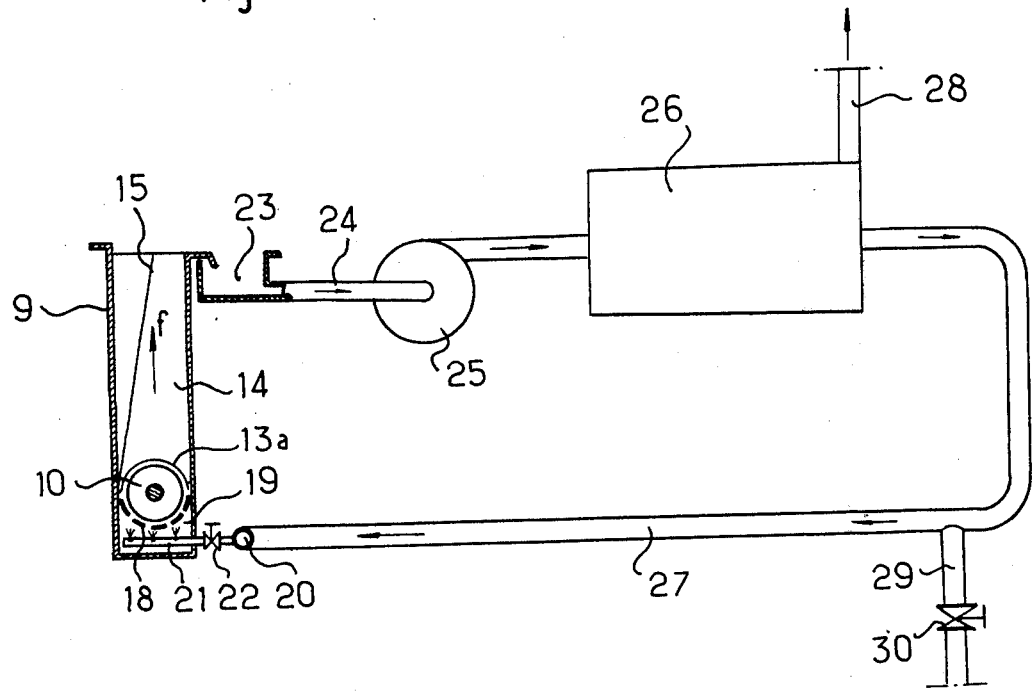
FIG. 2 is a cross-sectional view along II—II of FIG. 1.

With reference to FIGS. 1 and 2, an apparatus shown is provided with means for milling or crushing pieces of plastics material such as polyvinylchloride (PVC), which means include a crusher 1 having an inlet which communicates through a duct 2 with a blower 3. A hopper 4 is arranged to receive a waste material and opens into the duct 2. The outlet of the crusher 1 has a grid 5 and is connected via a conduit 6 to the inlet of a blower 7 the delivery side of which is connected to a conduit 8.

The apparatus also comprises a separation vessel 9 in the lower part of which an Archimedian screw 10 is mounted for rotation and is operatively connected to the driving shaft of a motor 11. The screw 10 is preferably a brush screw, i.e. it comprises bristles arranged along a helix on a central support. Transverse baffle plates 13 divide the vessel into a number of compartments 14. The baffle plates are formed with a circular cut-off portion 13 to allow the screw 10 to pass through at their lower part. In each compartment 14, an oblique sheet 15 is located and extends from the base of the partitions defining the compartment upwards and is in contact with one of the longitudinal side walls of the vessel at the bottom of the compartment and is a short distance from the other longitudinal side wall at the upper part of the vessel. Each compartment 14 has a decreasing cross-section from its base to the top thereof.

A hopper 16 is arranged below a cyclone 17 communicating with the conduit 8 and opens into the first compartment 14.

A perforated semicylindrical trough 18 is located below the screw 10 and covers the lower half of the screw. The trough forms the bottom of the separation vessel proper and defines a compartment 19 under the bottom of the separation vessel. A channel 20 extends along the vessel at its lower part and is connected to a series of ducts 21 each of which has a valve 22 and opens into the compartment 19.

A gutter 23 is provided at the upper part of the vessel on the side of the compartments 14. The gutter is connected via a conduit 24 to the suction side of a recycling pump 25 the delivery side of which is connected to the inlet of a filter 26. The outlet of this filter is connected to a channel 20 through a conduit 27, whereas a conduit 28 is arranged to evacuate solid materials which have not passed through the filter. An additional conduit 29 having a valve 30 and connected to a source of water under pressure communicates with the conduit 27 and is arranged to compensate for water losses.

At the end of the vessel 9, an Archimedian screw 31 is obliquely arranged and has its lower end in the compartment 19. This Archimediam screw is connected to the driving shaft of a motor 32 and is located within a sheath 34. The upper part of this sheath is connected to a blower 35 via a heating unit 36. It is also connected to a vertical tube 37 which opens into a hopper 38. The hopper 38 supplies a conduit 39 connected to a blower 40 through a re-heating unit 41.

The apparatus described above operates in the following manner.

The waste pieces for example of bottles for mineral water or oil are fed to the hopper 4. The waste pieces substantially comprise PVC, paper forming the labels and polyethylene forming bottle caps.

The waste pieces are pneumatically conveyed to the crusher 1. Pneumatic transporting permits the crusher to be accurately loaded and thus to be operated at a maximum efficiency.

After passage through the grid 5, the waste pieces are in the form of fine grains of PVC, paper and polyethylene, possibly together with other waste constituent parts. The granulates are conveyed by the blower 7 to the hopper 16 which feeds them into the vessel 9. The latter is full of water and the pump 25 generates an ascending water current in the various compartments 14 as is indicated by an arrow $f$ in FIG. 2. Owing to the slope of the partitions or walls 15, the speed of the current increases from the base of the compartments towards the upper part thereof.

Since the polyethylene has a density lower than 1 it floats on the water surface in the vessel. The paper and PVC, both having density higher than 1, tend instead to settle on the bottom of the vessel under the action of downward forces of a value $F_1 = K_1 (d_1 - 1)$ for the paper and $F_2 = K_2 (d_2 - 1)$ for PVC, where $d_1$ and $d_2$ are the respective densities of paper and PVC, and $K_1$ and $K_2$ are coefficients depending on the shape of the waste pieces. On the other hand, the ascending current of liquid within the vessel applies to paper and PVC forces acting upwards and of a value $F'_1 = K'_1 V^2$ for paper and $F'_2 = K'_2 V^2$ for PVC, where V is the speed of the ascending current.

V is determined in such a manner that, at the base of the compartment 14 where the speed V is minimum, the force $F'_1$ is higher than $F_1$ but force $F'_2$ is lower than $F_2$. In these conditions, the PVC pieces settle on the bottom of the vessel whence they are removed by the screw 10, while the paper pieces which could descend are lifted upwards, the force $F'_1$ acting on these pieces being higher the nearer the pieces are to the surface of the vessel. The paper pieces or parts are removed or evacuated together with water and polyethylene parts into the gutter 23, are separated from the water by filter 26 and unloaded through the conduit 28, whereas the water is re-injected via the conduit 27 below the trough 18 after partial addition of new water.

The succession of compartments 14 permits progressive refining of PVC while the PVC is being displaced towards the end of the vessel opposite the hopper 16. Since each compartment has its own water feeding conduit, it is possible to separately adjust the speed of the ascending liquid current in ecah compartment. During the displacement carried out by the screw, the PVC parts are brushed at the same time by the screw and are thus freed from possible paper parts which might adhere thereto.

The PVC parts are then conveyed by the screw 31 and dried within the sheath 33 by hot air from the heating unit 36. They subsequently fall through the duct 37 into the hopper 38 and the conduit 39 where they are pneumatically conveyed to a storing place, not shown.

Figure 3:
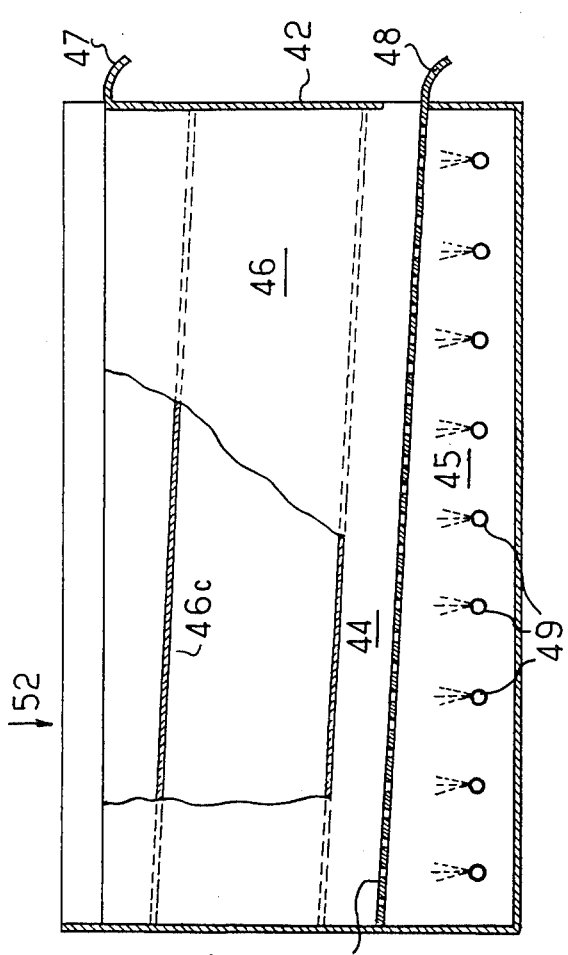
FIG. 3 is a cross-sectional view of the vessel according to a second embodiment.
Figure 4:
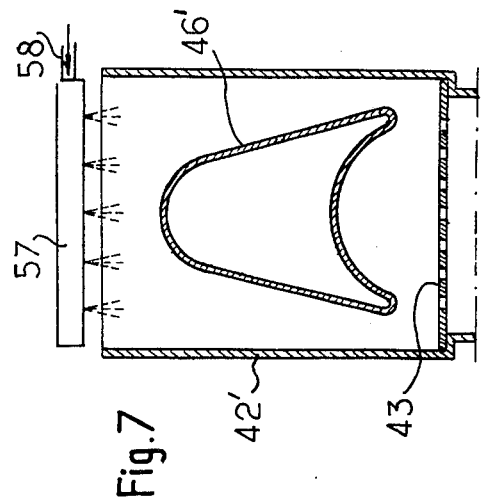
FIG. 4 is a longitudinal cross-sectional view of the vessel of FIG. 3.

In the embodiment shown in FIG. 3 and 4, the separation vessel 42 comprises a porous bottom 43 longitudinally and slopingly extending from one end to the other of the vessel. The bottom 43 separates the interior 44 of the vessel from a compartment 45. Vessel 42 comprises a duct 46 the sides 46a and 46b of which are oblique with respect to a vertical line. The upper wall 46c of the duct 46 is concave in cross-section thereby defining a gutter and is slopingly mounted. A weir 47 is provided above the duct at that end of the latter where its wall 46c is the lowest level. A second weir 48 is provided on the same side of the vessel at the base of the compartment 44. A plurality of conduits 49 connected to the same water supply duct 50 open into the lower compartment 45, each conduit having a respective control valve 51.

This apparatus operates in the same way as that of FIGS. 1 and 2. The parts of PVC, polyethylene and paper are fed to the vessel at its ends where the walls 43 and 46c are at the highest level as indicated by an arrow 52. At the same time, water is supplied to the compartment 45 through the conduits 49.

The paper parts are lifted by the ascending water current on both sides of the duct 46 and are evacuated into the gutter 46c to be discharged over the weir 47. The PVC parts settle on the lower part of the vessel and form a fluidized bed passing along the porous bottom 43 at a short distance above this bottom to be discharged over the weir 48.

Figure 5:
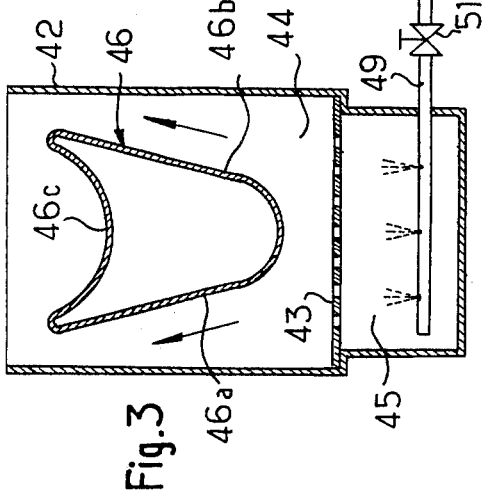
FIG. 5 is a longitudinal cross-sectional view of the vessel and shows a detail of a modification.

In the modification of FIG. 5, the porous bottom 43a is horizontal and is surmounted by transverse deflectors 53 obliquely arranged in such a manner that their upper ends are facing the weir 48. The ascending water current from the conduits 49 is thus obliquely oriented as indicated by arrows 54 and entrains the fluidized materials present below the bottom 43 towards the weir 48.

Figure 6:
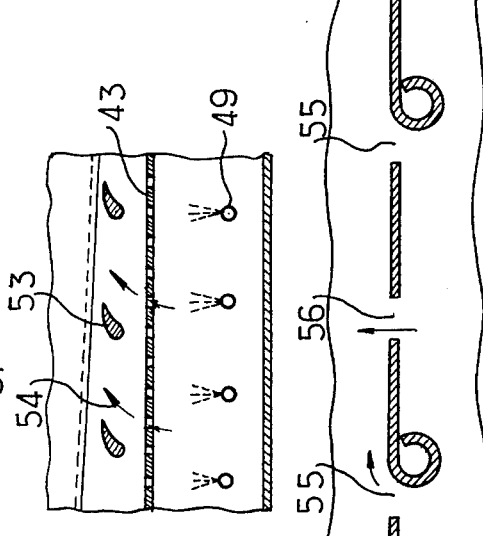
FIG. 6 is a longitudinal cross-sectional view of the vessel and shows a detail of another modification.

In the modification of FIG. 6, the bottom 43 is also horizontal and is formed with openings 55 the lower edges of which are rounded. Their opposite edge has a sharp ridge. The bottom 43 is also formed with openings 56 having sharp edges at their opposite borders. Various interacting currents flowing through these openings results in entrainment of the fluidized materials and in their brushing.

Figure 7:
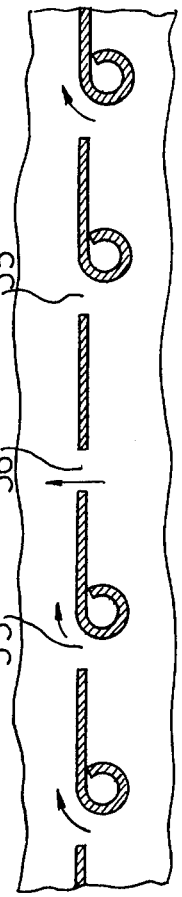
FIG. 7 is a view similar to FIG. 3 and of another embodiment.

The embodiment of FIG. 7 is substantially similar to that of FIG. 3. Duct 46' however, is arranged contrary to the duct 46. Moreover, vessel 42' is surmounted by a wetting manifold 57 which is connected to a water supply conduit 58. This embodiment permits a material lighter than water to be separated, for example, waste pieces of polyethylene including parts of paper or of PVC or other heavy impurities. These waste parts and impurities are entrained by the descending water current and are discharged over the weir 48 whereas polyethylene separated therefrom is discharged over the weir 47. The water supplied by the conduits 49 should be just enough to fluidize the materials present on the porous bottom 43 and should not affect the descending current.

A plurality of vessels can be arranged in series, for example several vessels 42 and each of them can be supplied by the outlet of the weir 48 of the preceding vessel, the ascending liquid current in the various vessels increasing in the downstream direction. As the flow rate of the incoming liquid increases from one vessel to the following one, it is necessary that the walls 46c of the various vessels be increasingly lower in the downstream direction. It is thus possible to separate several products of different density from each other. It is also possible to arrange one vessel 42' in series with one or several vessels 42 and to supply vessel 42' from the weir 47 of this first vessel.

The apparatus thus permits separation of several materials from each other, the materials having densities close, to lower than or higher than that of water. Since the thermoplastics materials have densities ranging from 0.85 and 1.45, it is possible to separate from each other and to refine the various elements of a mixture of thermoplastics materials such as PVC, polyethylene, polypropylene or polystryrene contaminated by dirt, paper, metals and organic waste.

From the description, it will be seen that the apparatus according to the invention can continuously operate, eliminates almost completely any foreign material contaminating the thermoplastics materials, requires very little power, and is no way polluting.

Of course, the invenion is not to be considered as limited to the described and illustrated embodiments but as covering any modification thereof falling within the scope of the following claims.

I claim:
1. A method for the separation of scrap plastic from impurities contained therein, comprising crushing scrap plastic, introducing the crushed scrap plastic into a horizontally elongated receptacle containing water, injecting water under pressure into the bottom of the receptacle in a direction both to create an ascending current of water in the receptacle with a velocity sufficient to entrain and thereby move upwardly impurities present in the crushed plastic while leaving the crushed plastic in a lower part of the receptacle, and to move the crushed plastic from one end to the other end in said receptacle, imparting to the rising water a progressively greater upward velocity as said water moves substantially from said one end to said other end of the receptacle, removing said impurities from an upper part of said other end of the receptacle, and removing the crushed plastic from which impurities have been removed from the lower part of said other end of the receptacle.

2. A method as claimed in claim 1, and directing said water upwardly through a plurality of openings in the bottom of the receptacle some of which are vertically directed and the remainder of which are upwardly obliquely directed in the direction in which the crushed plastic moves from end to end of the receptacle.

3. A method as claimed in claim 1, and feeding material removed from the upper part of a first said receptacle to a subsequent receptacle, and directing water downwardly against the material in the subsequent receptacle with a force sufficient to force heavier material downward but not lighter material.

4. Apparatus for separating scrap plastic from impurities, comprising means for crushing scrap plastic, means for feeding the crushed scrap plastic into a horizontally elongated receptacle containing water, means for moving the crushed plastic from one end to the other end in said receptacle while directing water upwardly in the receptacle at a velocity sufficient to entrain impurities and raise said impurities to an upper portion of the receptacle but insufficient to raise said crushed plastic from a lower part of the receptacle, said receptacle having at least two opposed side walls extending substantially full length of said receptacle which are flat and which converge upwardly thereby progressively to reduce the width of the receptacle in an upward direction so as progressively to increase the upward velocity of liquid moving in the receptacle substantially from said one end to said other end of the receptacle, means for removing said impurities from said upper part of said other end of the receptacle, and means for removing crushed plastic freed from said impurities from said lower part of said other end of said receptacle.

5. Apparatus as claimed in claim 4, in which the receptacle is horizontally elongated and has openings in its bottom for the upward passage of water therethrough, some of said openings being vertically directed and the remainder of said openings being obliquely upwardly directed in a direction lengthwise of the receptacle.

6. Apparatus as claimed in claim 4, in which the bottom of the receptacle is horizontal and has openings therethrough for the upward passage of water, some of said openings being limited along their longitudinal borders by sharp edges and others of said openings being limited along one of their longitudinal edges by a sharp edge, the opposite edge being rounded.

7. Apparatus as claimed in claim 4, and an additional receptacle to which is fed said impurities from the first-mentioned receptacle, and a wetting manifold disposed above said further receptacle to create a descending current in said additional receptacle thereby entraining the heavier material downward but not the lighter material, means in said further receptacle for removing lighter material from the top of said further receptacle, and means in said further receptacle for removing heavier material from the bottom of said further receptacle.

8. Appparatus as claimed in claim 4, there being a plurality of said receptacles in series with each other, material from one receptacle being fed to the next receptacle, the water in the receptacles having progressively greater upward velocity in the direction of movement of the material from receptacle to receptacle.

9. Apparatus as claimed in claim 8, wherein the series of receptacles includes separate receptacles for the reception of the lighter and heavier materials respectively from the first said receptacle.

* * * * *